Oct. 18, 1960
A. R. TROTT
2,957,058
FLAT TIRE SIGNALING SYSTEM FOR USE ON WHEEL
TRUCKS OR TRAILER HOUSES
Filed Jan. 26, 1959
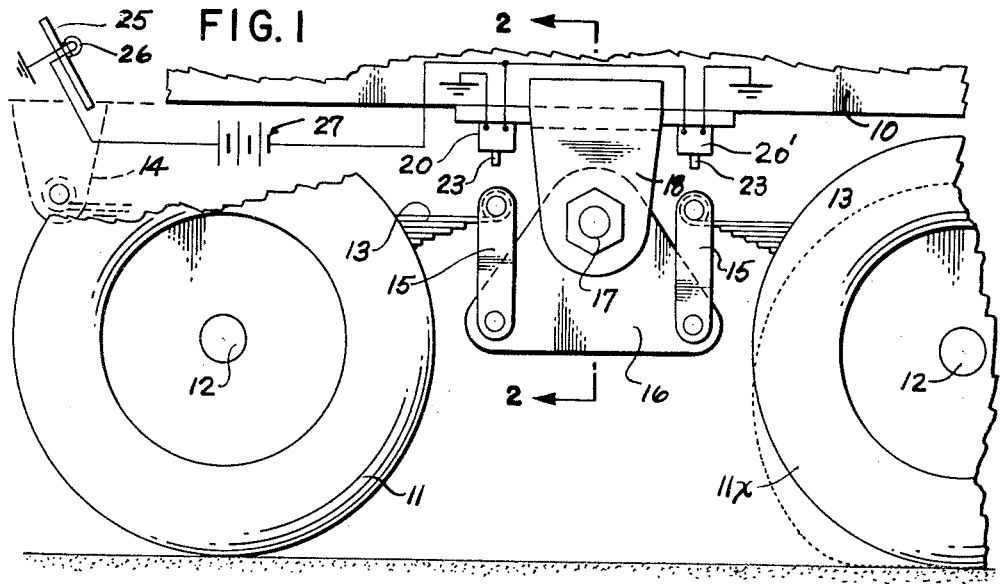
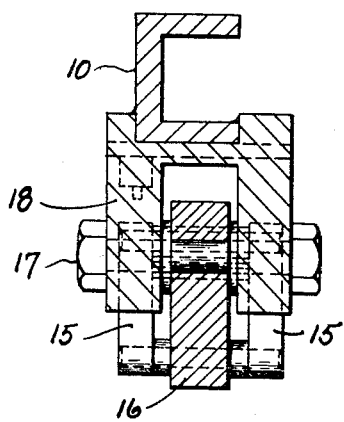
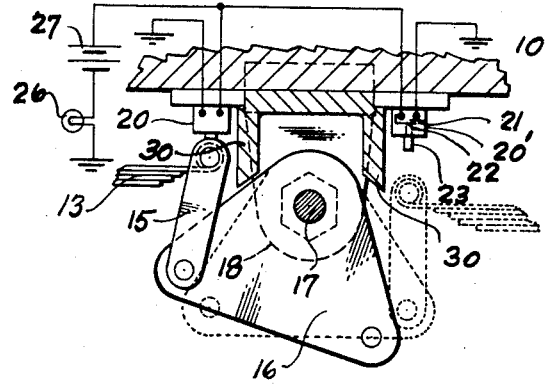
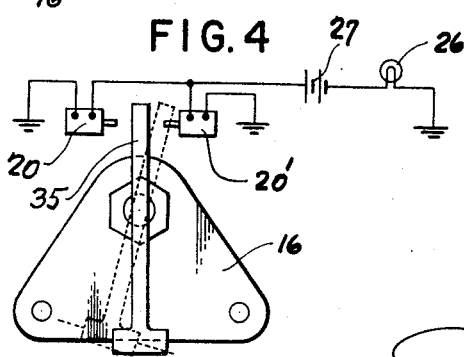
INVENTOR.
ARTHUR R. TROTT
BY
Robinson & Berry
ATTORNEYS United States Patent Office 2,957,058
Patented Oct. 18, 1960

2,957,058

FLAT TIRE SIGNALING SYSTEM FOR USE ON WHEEL TRUCKS OR TRAILER HOUSES

Arthur R. Trott, Clark Fork, Idaho

Filed Jan. 26, 1959, Ser. No. 789,148

2 Claims. (Cl. 200—61.22)

This invention relates to a means for use with those wheeled trucks of house trailers and the like, that utilize air inflated tires, for indicating to the driver of the trailer towing vehicle that a trailer tire is "flat" or is insufficiently inflated. More particularly, the invention applies to trailer trucks employing wheels in tandem arrangement at each side.

It is the primary object of this invention to provide an electrically operated signaling or indicating means of the kind or character above stated that is adapted to be electrically energized through any one of a plurality of circuit closing switches that are located at different positions where they will be engaged and activated to close the signal circuit, and thus energize the signal, incident to a certain abnormal change in the relationship of tandem wheels that occurs when one of the tandem wheels becomes flat, or deflated by leakage to a dangerous extent.

More specifically stated, the present invention resides in the provision of an electrical signaling system that is caused to be energized by an excessive tilting of the usual walking beam to which the adjacent ends of the springs, which support the tandem wheels are attached; such excessive tilting being caused by that relative dropping of the spring which carries the wheel on which the flat tire occurs.

Still further objects of the invention reside in the details of construction and relationship of parts embodying the present invention both in its present preferred form and also in a modified or alternative form of construction herein shown and described.

In accomplishing the above mentioned and other objects of the invention, I have provided the improved details of construction; the preferred forms of which are illustrated in the accompanying drawings, wherein:

Fig. 1 is a side view of tandem wheels and their mounting springs as used in the wheel truck of a common form of house trailer, and illustrating schematically the present "flat tire" signaling system as applied thereto.

Fig. 2 is a cross-section taken on line 2—2 in Fig. 1.

Fig. 3 is a side view of the walking beam as associated with the tandem wheels, showing it in an abnormal position that is incident to a tire of one of the wheels becoming flat or deflated to a dangerous extent.

Fig. 4 is a side view of the walking beam of the wheel trucks showing an alternative arrangement of the signal circuit closing switches and an alternative means for their actuation.

The present invention is applicable to house trailers of various kinds and using wheel trucks of varying forms of construction. The arrangement of parts of the wheel mounting truck here shown, is typical of those employing tandem wheels at each side, and it is to be understood that while I have shown the switches employed for closing the signaling circuit to be disposed for direct actuation by a spring or spring shackle, they might also be positioned for similar direct actuation by the walking beam or by an axle movement that is incident to the deflating of a tire of one of the wheels.

Referring more in detail to the drawings:

In Fig. 1, 10 designates what may be one of the longitudinal supporting beams of the trailer body frame structure, to which the wheel trucks are attached. As here indicated, the wheel trucks comprise tandem wheels 11—11x, at each side of the trailer body, corresponding wheels at opposite sides being mounted in the conventional manner on cross axles 12; the cross-axles being mounted at opposite ends in the usual way, on leaf springs 13 which at their outer ends are pivotally fixed to hanger brackets 14 that are fixed to beam 10 as shown in Fig. 1, and at their inner ends are pivotally connected, through use of oscillating shackles 15—15 with opposite ends of a walking beam 16.

The walking beam 16 is here shown to be of a triangular form, pivotally mounted between its ends by a pivot pin 17 in a bearing 18 that is fixed to the underside of beam 10.

The arrangement and connection of parts of the wheel truck, as above described, provides that when the tires of tandem wheels are properly inflated, the walking beam will remain substantially horizontal. It is also to be understood that in travel on ordinary highways it has limited oscillation. However, in the event of a tire becoming flat or deflated beyond an amount that is safe for driving, the walking beam will be tilted, as for example, from its normal position shown in dash lines in Fig. 3 to the full line showing; this tilting being due to the relative down drop of the spring which carries the wheel with the deflated tire.

In order to signal to the driver of the trailer towing vehicle that there is a deflated tire on the trailer truck, I provide the following means which is shown in Figs. 1, 2 and 3.

Mounted on the beam 10, or on any adjacent part of the trailer that is fixed relative to this beam, for example, on the bearing 18, are electric circuit control switches 20 and 20'. These switches are normally open but are so located and so mounted that one will be engaged and closed by the walking beam or a part that is connected thereto incident to the walking beam being tilted beyond its normal range of movement by reason of one of the tires of tandem wheels becoming deflated.

The electric switches here employed may be any of the conventional kinds in which one contact is stationary and the other is yieldable and adapted to be moved into circuit closing control with the fixed contact by inward pressure on a switch button or push rod. In the present instance the fixed terminal, as indicated at 21 in Fig. 3, is grounded while the other contact 22, is adapted to be moved by a push rod 23 which extends from the switch housing to a position for actuation by the selected part associated with the walking beam.

Located on the instrument panel, represented at 25 in Fig. 1, or on any other part of the towing vehicle where it will be readily visible to one riding in the driver's seat, is an incandescent electric lamp 26. This has one terminal grounded or is otherwise electrically connected to the terminals 21 of the switches 20—20'. Its other terminal is electrically connected to one terminal of the vehicle battery, herein designated at 27. The battery 27 has its other terminal grounded.

Assuming that the tire on wheel 11x becomes flat or deflated, it will drop the corresponding end of its mounting axle 12 to substantial extent and this will cause the walking beam 16 to assume an abnormal angular position, as for example, that shown in Fig. 3. The end of spring 13, as carried by the shackles at the higher end of the walking beam will be lifted against the push rod of the corresponding switch, thus to cause the switch to be closed. This closes the electric lamp circuit and illuminates the lamp, to inform the driver of the deflated condition of the tire. If it should be the tire on wheel 11 that becomes deflated, then the walking beam will tilt in the opposite direction and the lamp circuit would be completed in a like manner through the closing of the other switch.

In Fig. 4, I have illustrated an alternative arrangement of the switches, and an alternative means for closing them. In this view, the switches 20 and 20' are mounted in horizontal alignment and spaced, with their closing members extended toward each other. A lever arm 35, of resilient spring metal is fixed to the walking beam to extend upwardly through the axial line of its mounting pin 17, to a position midway between the switches. Should the walking beam be tilted beyond normal position due to a tire deflation, then the lever arm will move to such extent as to engage and close one of the switches. In the showing of Fig. 4, the electrical connections with the signal lamp would be like those described in connection with Fig. 1.

To avoid possible injury to the switches by the closing means, stops such as at 30 in Fig. 3, can be applied to the frame beam 10 or to the bearing 18 to positively limit the extent of upward tilting of the walking beam, or the part which engages the switch member 24, for closing it. Such stops can be spot welded in place or otherwise secured.

In lieu of using an electric lamp as the visible signaling means, an electric bell or buzzer might likewise be employed.

It is also anticipated that the same signaling effect might be achieved by the actuation of switches located in positions at which the movement of a wheel axle 12 to an unusual position relative to a trailer body part by reason of a deflated tire, will operate to close the signal circuit.

It is further anticipated that the switches 20 and 20' might be mounted on magnitized plates in order that they may be readily applied at most satisfactory places on the vehicle frame without requiring bolting, welding or other less convenient methods for their securement.

What I claim as new is:

1. In a tire deflation indicator for a vehicle having a chassis with a frame, tandem axles equipped with normally inflated pneumatic tires, a suspension means for said axles including a walking beam that is pivoted on the frame for tilting movement, in opposite directions from a normal position, in accordance with the deflation of the tire of either one of said wheels, a signal operating switch corresponding to each wheel and a switch actuator member movable by and in accordance with the tilting of the walking beam that is incident to deflation of a tire, to actuate the switch corresponding to the deflated tire.

2. The combination recited in claim 1 wherein the walking beam is located between the tandem wheels and is pivoted between its ends on the frame, and said suspension means includes a spring shackle at each end of said walking beam adapted, with that tilting of the beam that is incident to deflation of a tire, to actuate the corresponding signal operating switch.

References Cited in the file of this patent

UNITED STATES PATENTS

| | | |
|---|---|---|
| 2,426,360 | Larison | Aug. 26, 1947 |
| 2,499,669 | Murat | Mar. 7, 1950 |